United States Patent [19]

Hajduk

[11] 4,101,967

[45] Jul. 18, 1978

[54] SINGLE BIT LOGIC MICROPROCESSOR

[75] Inventor: Marian Stanislaw Hajduk, Whitestone, N.Y.

[73] Assignee: Tendy Electronics Co., New York, N.Y.

[21] Appl. No.: 687,867

[22] Filed: May 19, 1976

[51] Int. Cl.² ........................ G06F 7/00; G06F 7/38
[52] U.S. Cl. .................................................. 364/900
[58] Field of Search .................. 340/172.5; 445/1; 364/200 MS File, 900 MS File

[56] References Cited

U.S. PATENT DOCUMENTS

| | | | |
|---|---|---|---|
| 3,391,394 | 7/1968 | Ottaway et al. | 340/172.5 |
| 3,500,466 | 3/1970 | Carleton | 340/172.5 |
| 3,631,400 | 12/1971 | Dervan | 340/172.5 |
| 3,798,615 | 3/1974 | Weisbecker | 340/172.5 |
| 3,909,789 | 9/1975 | Holtey et al. | 340/172.5 |

*Primary Examiner*—Mark E. Nusbaum
*Attorney, Agent, or Firm*—Brady, O'Boyle & Gates

[57] ABSTRACT

A single bit recycling microprocessor which performs sequential and combinational logic equations. The microprocessor has exclusive input and output instructions and performs three basic logic operations, two of which are performed concurrently on each data input. The processor substitutes read only memory (ROM) for a network of logic gates, multiplexers, decoders, flip-flops and counters. The simulation of J-K flip-flops is accomplished by a tandem operation of two R-S flip-flops.

9 Claims, 6 Drawing Figures

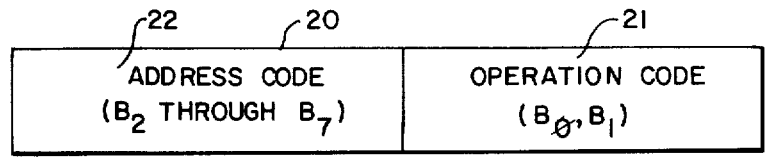

FIG. 2

| OPERATION CODE B₀ B₁ | INSTRUCTION |
|---|---|
| 1    1 | NOT (INPUT DATA) |
| 1    0 | TRUE (INPUT DATA) |
| 0    0 | NAND (BOOLEAN OUTPUT DATA) |
| 0    1 | OR (BOOLEAN OUTPUT DATA) |

FIG. 3

| INSTRUCTION CARD<br>B₀ B₁ B₂ B₃ B₄ B₅ B₆ B₇ | INSTRUCTION |
|---|---|
| 1  1        ADDRESS BITS | NOT (INPUT DATA) |
| 1  0        ADDRESS BITS | TRUE (INPUT DATA) |
| 0  0  1     ADDRESS BITS | NAND BOOLEAN (OUTPUT DATA) |
| 0  1  1     ADDRESS BITS | OR BOOLEAN (OUTPUT DATA) |
| 0  0  0  1  ADDRESS BITS | NAND SET |
| 0  1  0  1  ADDRESS BITS | OR SET |
| 0  0  0  0  ADDRESS BITS | NAND RESET |
| 0  1  0  0  ADDRESS BITS | OR RESET |

FIG. 5

SINGLE BIT LOGIC MICROPROCESSOR

BACKGROUND OF THE INVENTION

Considerable work has been done on optimization and mechanization of the combinational and sequential logic design, but so far, none of the current methods have found a broad industrial application. Therefore, it is the purpose of this invention to provide a means broadly applicable for automation and optimization of the logic design process.

To lower the cost of logic controllers, some Large Scale Integrated(LSI) circuits, such as Programmable Logic Arrays, have been developed. Most of these chips, however, do not provide for sequential logic circuits. Therefore, it is another purpose of this invention to provide for a versatile type of chip, capable of providing combinational and sequential logic circuits.

The aforementioned Programmable Logic Arrays do not use the chip area as efficiently as Read Only Memories (ROM). Therefore, it is still another purpose of this invention to provide the logic circuits on highly efficient ROM chip structures.

The standard microprocessors have a plurality of instructions, to allow for a broad scope of applications. This, however, makes the instruction word and consequently the size of the required ROM less than optimal for any one particular application. Therefore, it is yet another purpose of this invention to provide for optimal usage of ROM memory in logic applications by providing an optimal logic operations instruction set.

Standard microprocessors process all input data serially, which results in a slow processing speed. To speed up the operation, a parallel fed microprocessor could be added, but at a considerable increase in hardware. Therefore, it is still another purpose of this invention to provide for a simple serially fed parallel microprocessor interface to achieve the required processing speed.

At present, the microprocessors require numerous external chips which lower the system reliability and increase the system cost. Therefore, it is yet another purpose of this invention to lower the system cost and to increase its reliability by including on the microprocessor chip most of its associated hardware.

The present microprocessors require numerous external devices, which cannot take the full advantage of the future high density LSI technologies. And still another purpose of this invention therefore is to provide for future technologies by providing a self-contained logic microprocessor, having exclusively the I/O select and the data input and output pins.

SUMMARY OF THE INVENTION

The microprocessor processes the logic equation of the type:

$$F_0 = \overline{(\overline{X_1 X_2 X_3} + X_2 + X_4) X_5 \overline{X_6} X_7}$$

by breaking the equation into a set of separate NAND and OR logic operations and performing these basic logic operations in a predetermined order. The microprocessor has built in hardware which performs automatically and concurrently the NAND and OR logic operations on the sequentially fetched input data. The output instruction which follows a sequence of the associated input instructions selects to the output either the NAND or OR logic operation on the previously fetched input data. The above logic equation is processed by performing the logic operations represented by the following equations:

$$F_1 = \overline{X_1 X_2 X_3} \tag{1}$$

$$F_2 = \overline{F_1} + X_2 + X_4 \tag{2}$$

$$F_0 = \overline{F_2 X_5 \overline{X_6} X_7} \tag{3}$$

Since all terms on the right hand side of the equations (1) through (3) are the input data, and all terms on the left hand side of these equations are the output data, the microprocessor needs only the data input and data output instructions. These data input and data output instructions are provided by the first bit of the instruction word. To provide for higher efficiency of the microprocessor, a second instruction bit specifies the data itself. The second bit selects on the input either the "true" or "not" logic value of the input data, and it selects on the output either the NAND or OR logic function of the input data. The remaining bits of the instruction word directly address the input and output data.

BRIEF DESCRIPTION OF THE DRAWINGS

FIG. 2 is illustrative of the instruction word format;

FIG. 3 specifies operation codes of the basic logic instructions;

FIG. 5 is illustrative of the expanded logic instructions set; and

DESCRIPTION OF THE PREFERRED EMBODIMENT

Figure 1:
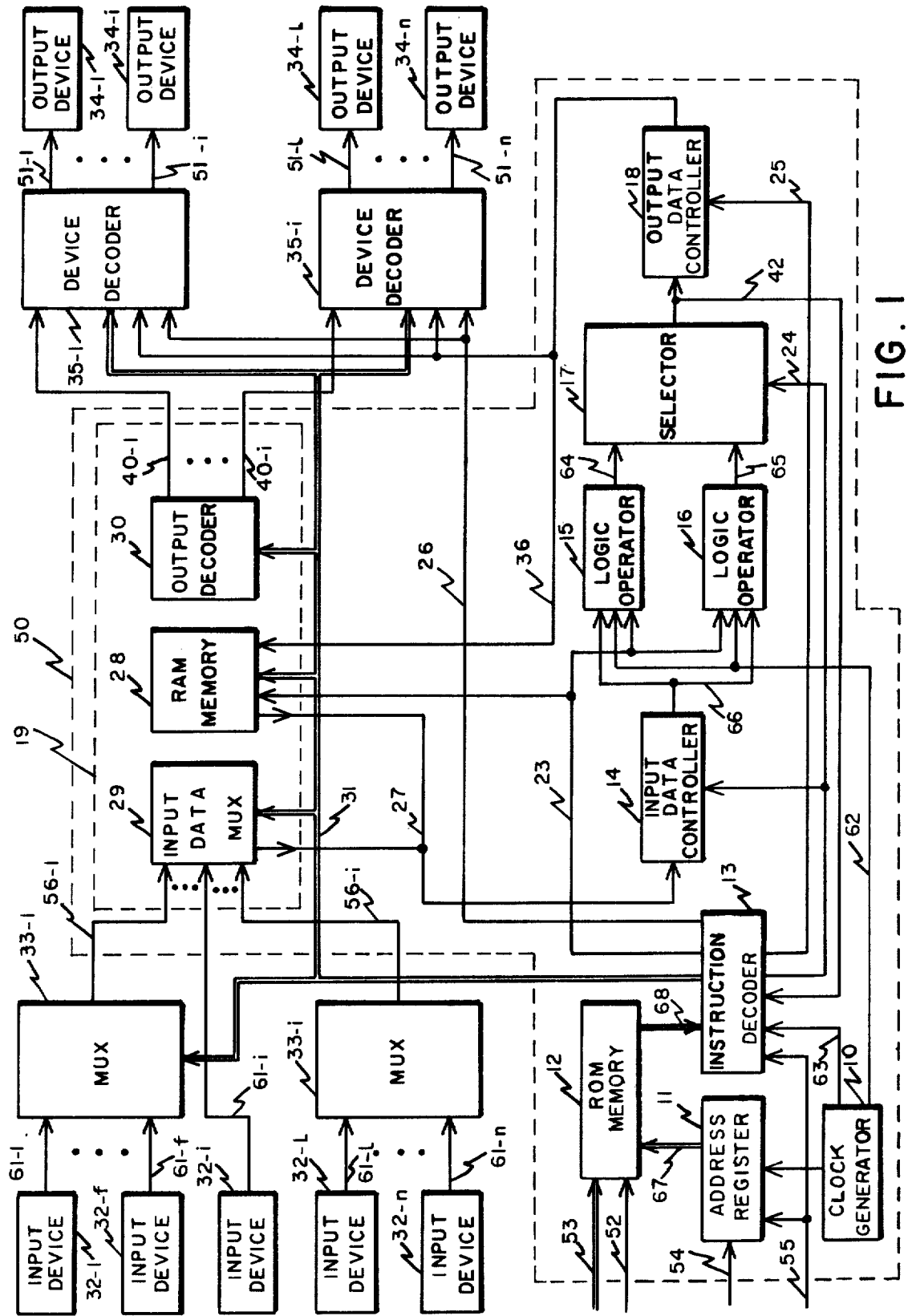
FIG. 1 is an electronic block diagram illustrating the preferred embodiment of the subject invention.

Discussing the preferred embodiment with reference to FIG. 1, the microprocessor is comprised of a clock generator 10, address register 11, read only memory (ROM) 12, instruction decoder 13, input data controller 14, NAND logic operator 15, OR logic operator 16, dual input selector 17, output data controller 18 and input/output data storage 19.

The address register 11 is preferably a free-running counter driven by the clock generator 10 and used for addressing consecutive ROM 12 memory locations which store the logic operation instructions. Upon addressing the last instruction word in the ROM memory 12, the address register 11 overflows or resets; and the process of addressing and executing the consecutive ROM memory 12 locations continues, thus providing for a continuous and repetitious processing of input data.

The ROM 12 stores instruction words 20 of the format shown in FIG. 2. The instruction word 20 comprises an operation code 21 including bits $B_0$ $B_1$ and address code 22 including bits $B_2$ through $B_7$. The two instruction bits $B_0$ and $B_1$ of the operation code 21 provide for four basic microprocessor instructions which are listed in FIG. 3. The bit $B_0$ specifies whether the instruction 20 is fetching an input data or outputting a result of logic operation. Since it was arbitrarily assumed in FIG. 3 that $B_0 = 1$ fetches an input data and $B_0 = 0$ outputs a result of logic operation, an instruction with $B_0=1$ is called the input instruction and an instruction with $B_0=0$ is called the output instruction.

The instruction decoder 13 decodes the instruction word 20 (FIG. 2) out of ROM 12, and executes the specified logic operation out of the ROM 12 by means of control lines 23, 24, 25 and 26. Such apparatus is well known to those skilled in the art. The control lines 23 and 24 are responsive to the instruction bits $B_0$ and $B_1$, respectively. If the control line 23 is at a logic "one" data state, it enables the logic operators 15 and 16 to be responsive to their input data. If the control line 23 is at a logic "zero" data state, it enables the I/O data storage 19 to store the output of either the logic operator 15 or 16, as further specified by the control line 24. The input data controller which may be implemented by a TI SN 74157 IC module, for example, selects either "true" or "not" value of serially fed input data $X_1, X_2 \ldots$ on order from a signal applied from the decoder 13 on control line 24. The data controller's 14 outputs either the "true" or "not" logic value (FIG. 3) of its input data signal applied via line 27. The control line 24 from the decoder 13 also selects by means of the selector 17 comprised of a TI SN 74157 module, for example, either of the logic operators' 15 or 16 output. The concurrent selection of the input data 27 and the respective outputs of the logic operators 15 and 16 by the control line 24 is allowed because the input data 27 is processed by the logic operators 15 and 16 only if bit $B_0=1$ and the logic operators' 15 and 16 are stored in the I/O data storage 19 only if the bit $B_0=0$.

If the logic operators 15 and 16 are both reset, then the first "zero" logic input data state sets the output of logic operator 15 to logic "one", and the first "one" logic input data state sets the output of logic operator 16 to logic "one". As a result, the logic operators 15 and 16 perform the NAND and OR logic operations, respectively.

The output data controller 18 which may also be implemented by a TI SN 74157 module is responsive to the output of selector 17 and it provides under control signal on line 25 from the decoder 13 either the selector 17 output or remains at a "zero" level meaning that it does nothing.

The I/O data storage 19 includes a random access memory (RAM) 28, input data multiplexer 29 which, for example, may be implemented by a TI SN 74151, and output decoder 30. The outputs of the RAM memory 28 and multiplexer 29 are provided under control of address lines 31 being responsive to the address code 22. Since the multiplexer 29 operates as an extension of the RAM memory 28, therefore the outputs of the RAM memory 28 and multiplexer 29 are tied together providing input data signal line 27. The inputs to the multiplexer 29 are outputs of external devices 32-1 ... 32-n, or external multiplexers 33-1 ... 33-i also configured from TI SN 74151 modules, for example, operating as extensions of the multiplexer 29. The RAM memory 28 stores the results of processing of the auxiliary logic equations (1) and (2) provided by the logic operators 15 and 16 via the selector 17 and output data controller 18. The result of the final equation (3) is provided to a selected one of a plurality of output devices 34-1 ... 34-n via one of the device decoders 35-1 ... 35-i, output decoder 30, controller 18 and selector 17. However, if the above mentioned final equation (3) is used as an output term for another higher order equations, then the equation (3) is both stored in the RAM memory 28 and fed to one of the output devices 34-1 ... 34-n.

Figure 4:
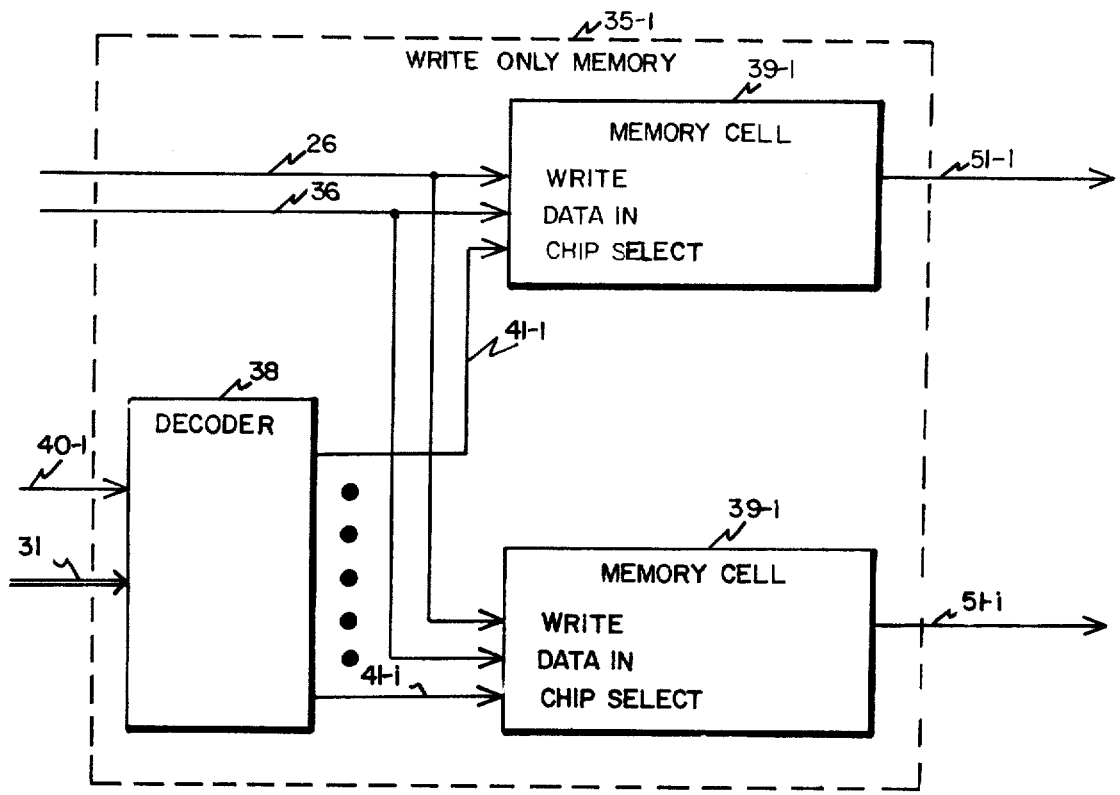
FIG. 4 is a block diagram of the write only memory utilized by the subject invention.

The output decoder 30 is of the Texas Instruments Inc. SN 7442 type or equivalent, and it is responsive to the high order address lines 31. A device decoder e.g. 35-1 is enabled by the output 40-1 of the decoder 30 and it operates as an extension of the output decoder 30 by responding to the lower order address lines 31. The device decoder 35-1 is preferably a write only memory type of device described with reference to FIG. 4. The write only memory 35-1 is comprised of decoder 38, and memory cells 39-1 ... 39-i. The decoder 38 is responsive to the lower order address lines 31 and it is enabled by the signal line 40-1 being a decoded signal of the higher order address lines 31. The decoder 38 output signal line 41-1 selects a memory cell 39-1 to be responsive to the write memory signal line 26 provided by the instruction decoder 13 shown in FIG. 1. The signal line 26 writes into the memory cell 39-1 the data on the signal line 36.

Having described the basic microprocessor hardware a specific reference is now made to the processing of the logic equations (1), (2) and (3). To perform the logic equation (1), the ROM 12 stores four instructions. The first instruction fetches an external variable $X_1$ via one of the multiplexers e.g. 33-1 and multiplexer 29 and provides its "true" logic level on the input of the logic operators 15 and 16. The second and third instructions fetch the variables $X_2$ and $X_3$ and present them consecutively on the input of the logic operators 15 and 16. If any of the fetched variables $X_1$, $X_2$ or $X_3$ is a logic "zero" signal, the logic operators 15 output goes to logic "one" level. If any of the fetched variables $X_1$, $X_2$ or $X_3$ is a logic "one" level, the logic operators 16 output goes to logic "one" level. The fourth instruction selects on the output of the selector 17 the NAND logic operators's 15 output, and stores this selected logic signal in the RAM memory 28 under control of the write signal 23 at the location $F_2$ specified by the signal lines 31. Following the writing into the RAM memory 28, the aforementioned fourth instruction resets the NAND and OR logic operators 15 and 16 to their initial state.

To perform the logic equation (2) a fifth instruction fetches from the RAM memory 28 the data $F_1$ stored under control of the fourth instruction, inverts its logic level by operating on input data controller 14, and presents this inverted logic signal on the input of the logic controller 15 and 16. The instructions sixth and seventh fetch the external variables $X_2$ and $X_4$, and provide their "true" logic levels on the logic operators' 15 and 16 input. The eighth instruction stores the OR logic operator's 16 output in RAM memory 28 at a location $F_2$ specified by the signal lines 31. The ninth instruction fetches the $F_2$ data from the RAM memory 28 and presents on the logic operators' 15 and 16 input its inverted logic level. The tenth, eleventh and twelfth instructions provide to the logic operators 15 and 16 the external variables $X_5$, $X_6$, $X_7$, respectively. The thirteenth instruction selects an output device e.g. 34-1 by means of the decoders 30 and e.g. 35-1 and provides it with the logic level of the NAND logic operator's 15 output. Should the decoder 35-1 be a write only memory type of device, a memory cell e.g. 39-1 connected to the device e.g. 34-1 stores the logic operator's 15 output.

If the microprocessor has a NAND or NOR logic operator, a one bit operation code is sufficient to perform any logic equation, because every input data can be inverted if necessary by the NAND or NOR operator and every logic equation can be represented by a NAND or NOR set of basic logic equations. A microprocessor with one operation code bit, however, requires two additional instruction words to fetch a "not" logic value of the input data. Such a microprocessor also requires the logic equation to be represented by a much larger set of basic logic equations if only one basic logic operator, such as NAND or NOR, is provided by the microprocessor.

The logic microprocessor has three basic types of instructions shown in FIG. 5: the copy or Boolean instruction, the set, and the reset instruction. The copy instruction transfers the selector's 17 data output on data line 42 to the RAM memory 28 without any modification by the data controller 18. The set and reset instructions are used to simulate the R-S flip-flops in RAM memory 28. If a set instruction is executed, and the line 42 has a logic "one" data state the condition for setting the R-S flip-flop is satisfied. The instruction decoder 13 which is responsive to the signal on line 42 writes, by means of the line 23 a logic "one" data state into the RAM memory 28 location, simulating a setting of a R-S flip-flop. However, if the line 42 has a logic "zero" data state during execution of the set instruction, the condition for setting of the R-S flip-flop is not satisfied; and the decoder 13 being responsive to the signal line 42 does not produce a write pulse on the signal line 23.

If a reset instruction is executed and the signal line 42 has a logic "one" data state the condition for resetting the R-S flip-flop is satisfied, the decoder 13 writes a logic "zero" data state, provided by the data controller 18 under control of line 25, into the RAM memory 28. However, if the line 42 has a logic "zero" data state, indicating that the condition for reset is not satisfied, the decoder 13 does not produce a write pulse on line 23.

Should there be employed a convention that a logic "zero" data state on the signal line 42 indicates a satisfied R-S flip-flop reset condition, the data controller 18 could be removed from the microprocessor's hardware, and signal line 42 could be directly connected to the signal line 36.

The instruction decoder 13 can decode the set, reset and copy instructions either from the address code 22 of the instruction word 20 or by means of two additional bits, assigned conditionally to the operation code 21.

The instruction decoding from the address code 22 of the instruction word 20 can be provided by means of a comparison with two address references provided within the decoder 13. If the address code 22 of an output instruction is smaller than the first address reference, a set instruction is decoded. If the address code 22 of an output instruction 20 is larger than the absolute value of the complement of the first address reference, a reset instruction is decoded. If the address code 22 of an output instruction 20 is larger than the first address reference and smaller than the second address reference, a copy instruction is decoded. If the address code 22 of an output instruction 20 is larger than the second address reference but smaller than the absolute value of the complement of the first address reference, an output device 42 is selected.

If the address code 22 of an input instruction 20 is smaller than the aforementioned second address reference, the input data is fetched from the RAM memory 28. However, if the address code 22 of an input instruction 20 is larger than the second address reference, the input data is provided from external devices via multiplexer 29 being a part of the I/O data storage 19.

It is preferable, however, that the microprocessor uses an instruction word 20 with a variable length of its operation code 21. The operation of such instruction word is now explained in reference to FIG. 5. The input instructions 20 require only two operation code bits: $B_0$ and $B_1$. The remaining bits $B_2$ through $B_7$ are the address code 22 of the instruction word 20. The output instructions are divided into the copy instructions and the set/reset instructions. The copy output instructions require a three bit operation code comprising bits $B_0$, $B_1$ and $B_2$ with the remaining bits $B_3$ through $B_7$ addressing the locations of the output data. The set/reset output instructions require a four bit operation code, and the remaining bits of the instruction word 20 address the locations of the simulated R-S flip-flops.

The decoding of the output instructions from the address code of the instruction word requires more hardware than the decoding from the operation code. It has, however, better flexibility in addressing the RAM memory 28, input devices 31-1 . . . 32-$n$ and output devices 34-1 . . . 34-$n$.

Figure 6:
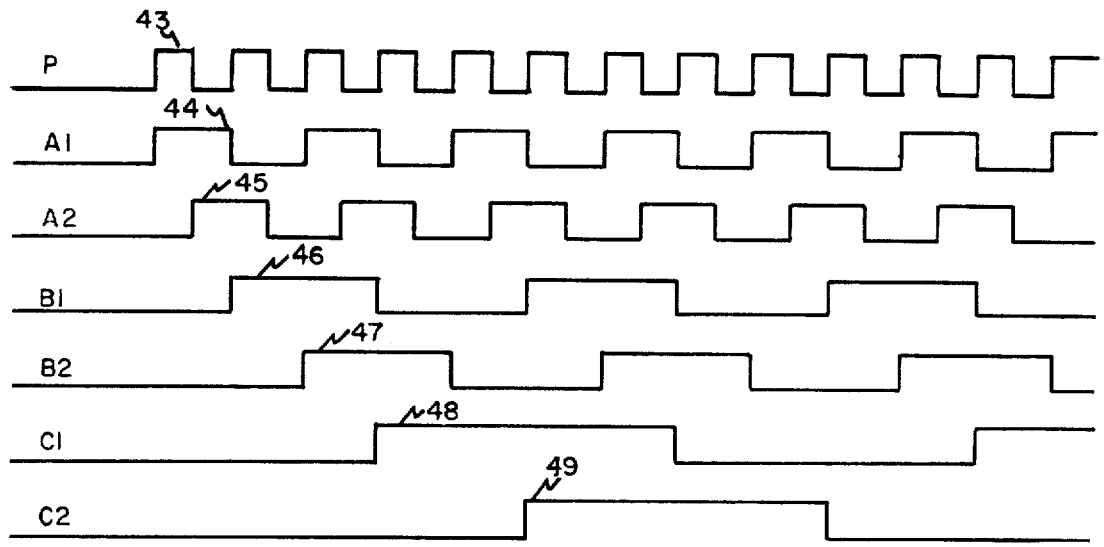
FIG. 6 discloses a timing diagram helpful in understanding the operation of the subject invention.

As mentioned earlier, the J-K flip-flops are simulated by a tandem operation of two R-S flip-flops. The operation of such tandems is now explained in reference to FIG. 6. The waveform 43 represents clock pulse train P provided on the signal line 27 either by an input device 32-1 . . . or by a simulated R-S flip-flop in the RAM memory 28. The waveforms 44 and 45 represent logic levels of two R-S flip-flops, $A_1$ and $A_2$, working in a tandem. The R-S flip-flops $A_1$ and $A_2$ are simulated in two locations within the Nx1 bit RAM memory 28. The flip-flop $A_1$ is set by logic function $\overline{A}_2P$, and flip-flop $A_2$ is set by $A_1\overline{P}$. The flip-flop $A_1$ is reset by $A_2P$, and the flip-flop $A_2$ is reset by $\overline{A}_1\overline{P}$. As a result of this tandem operation, the R-S flip-flops $A_1$ and $A_2$ change their states only in response to the clock P 43 transitions, as shown in FIG. 6.

The counter is built with J-K flip-flops. The FIG. 6 also shows two additional tandems of R-S flip-flops, B and C. The tandem B is built with R-S flip-flops $B_1$ and $B_2$ and is represented by the waveforms 46 and 47. The tandem C is built with R-S flip-flops $C_1$ and $C_2$ and is represented by the waveforms 48 and 49. The tandems B and C operate similarly to the tandem A, built with flip-flops $A_1$ and $A_2$, except that they are responsive to the output of the preceding J-K flip-flop instead of the clock waveform 43. As a result, the flip-flop $B_1$ is set by $\overline{A}_1A_2\overline{B}_2$, and the flip-flop $B_2$ is set by $A_1\overline{A}_2B_1$. The flip-flop $B_1$ is reset by $\overline{A}_1A_2B_2$, and the flip-flop $B_2$ is reset by $A_1\overline{A}_2\overline{B}_1$. Similarly, flip-flop $C_1$ is set by $\overline{B}_1B_2\overline{C}_2$, and flip-flop $C_2$ is set by $B_1\overline{B}_2C_1$. The flip-flop $C_1$ is reset by $\overline{B}_1B_2C_2$, and the flip-flop $C_2$ is reset by $B_1\overline{B}_2\overline{C}_1$.

Since the aforementioned J-K flip-flops form a chain of J-K flip-flops in which each preceding J-K flip-flop provides a clock for the succeeding J-K flip-flop, they form a three stage counter.

There can be various modifications to the set and reset conditions of R-S flip-flops, however, the tandem operation of the R-S flip-flops is the necessary condition to simulate the J-K flip-flops.

The microprocessor 50 can be packaged in several ways. The preferable form is by way of an integrated circuit which includes all the microprocessor hardware 50 shown in FIG. 1. During programming of the ROM memory 12, the signal line 52 is activated and it provides for storing the externally provided instruction words 20 in the ROM memory 12. The instruction words 20 are provided on signal lines 53. The countup signal line 54 advances the address register 11 which addresses the consecutive ROM memory 12 locations to allow for programming of each of the ROM memory 12 locations. The reset signal line 55 provides initialization of the chip, which includes setting to logic zero all of R-S flip-flop locations in the RAM memory 28.

There can be several modifications to the hardware presented in FIG. 1. The most apparent modification is to use an AND operator instead of the NAND operator 15. However, since the purpose of this disclosure is to provide an illustrative description of the invention, no attempt is made to describe all of the microprocessor variations which fall within the spirit and scope of the invention.

Having thus described what is at present considered to be the preferred embodiment of the subject invention;

I claim:

1. A logic microprocessor comprising in combination:
   a single serially fed input data controller means having a data input, a control input, and a single data output;
   first and second logic operator means each having a respective single data input commonly coupled to said single data output of said input data controller means and each being fed the same serial data thereby and a single data output;
   data selector means having a pair of data inputs respectively coupled to the single data output of said first and second logic operator means, a control input and a data output;
   an instruction word memory, means for accessing instruction words from said memory, and a decoder responsive to said instruction words for providing a control signal output comprised of at least first and second instruction bits, said first instruction bit being coupled to said first and second logic operator means for enabling said operator means, said second instruction bit being coupled to said input data controller means and said data selector means; said input data controller means including means responsive to said second instruction bit to selectively provide a data output signal having either a first (true) or second (not) logic value of the input data applied to said data input thereof;
   said first logic operator means including means set by one of said logic values to perform a predetermined first type of logic operation thereon,
   said second logic operator means including means set by one of said logic values to perform a predetermined second type of logic operation thereon, and
   said data selector means including means responsive to said second instruction bit to provide a data output signal at its data output selectively either the output of said first logic operator means or the output of said second logic operator means.

2. The apparatus as defined by claim 1 wherein said first logic operator means is set by said first logic value and said second logic operator is set by said second logic value.

3. The apparatus as defined by claim 1 and additionally including a random access memory utilized for storing intermediate results of predetermined logic operations of said first and second logic operator means and having a control input coupled to said decoder and being responsive to said first instruction bit therefrom to selectively fetch data from said data selector means or output stored data to said input data controller means and having a data input coupled to the data output of said data selector means and a data output coupled to the data input of said input data controller means, and wherein
   the enablement of said first and second logic operator means by said first instruction bit comprises being reset to an initial state to thereafter perform a predetermined type of logic operation.

4. The apparatus as defined by claim 3 and additionally including:
   another data selector means having a plurality of data inputs and a data output, said data output being coupled to said data input of said input data controller means, said plurality of data inputs being coupled to respective input means,
   output decoder means having a data input coupled to the data output of said data selector means and providing at least one data output; and
   an instruction decoder coupled to said another data selector means, said random access memory and said output decoder for applying instruction control signals thereto.

5. The apparatus as defined by claim 4 and additionally including output data controller means having a data input coupled to the data output of said data selector means and having a data output coupled to the input of said random access memory for storing the output of said output data controller means, said random access memory being operative to store said output in response to an instruction control signal from said instruction decoder.

6. The apparatus as defined by claim 5 wherein said output decoder means includes internal memory means for storing data output signals from said output data controller means in response to an instruction control signal and having a plurality of output lines adapted to provide a respective stored data value concurrently thereon in parallel.

7. The apparatus as defined by claim 4 and additionally including a read only memory, having a stored program, coupled to said instruction decoder for providing sequence control signals to said instruction decoder whereupon said decoder becomes operative to generate said first and second instruction bits.

8. The apparatus as defined by claim 7 wherein said read only memory comprises an electrically programmable memory.

9. The apparatus as defined by claim 7 and additionally including an address register and a clock generator, said clock generator being coupled to said address register for applying operation timing signals thereto, said address register being coupled to said read only memory for addressing the stored program in said read only memory.

* * * * *